Feb. 21, 1950     E. L. COPENHAVER     2,498,615
ENDLESS BAND BLADE CAKE SLICING MACHINE

Filed Sept. 4, 1945     4 Sheets-Sheet 1

Inventor
Elmer L. Copenhaver

By Bernard F. Garvey
Attorney

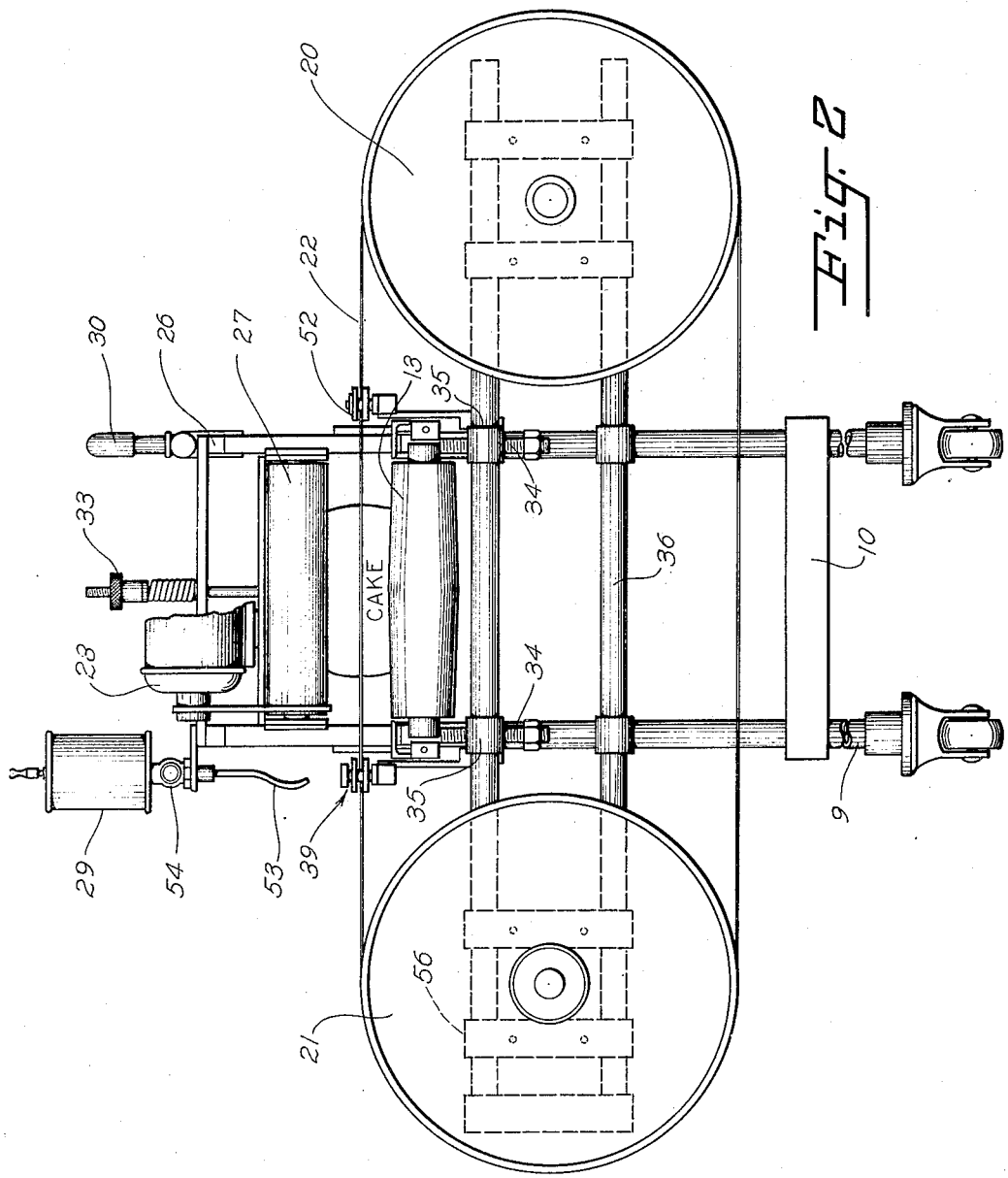

Feb. 21, 1950 E. L. COPENHAVER 2,498,615
ENDLESS BAND BLADE CAKE SLICING MACHINE
Filed Sept. 4, 1945 4 Sheets-Sheet 3
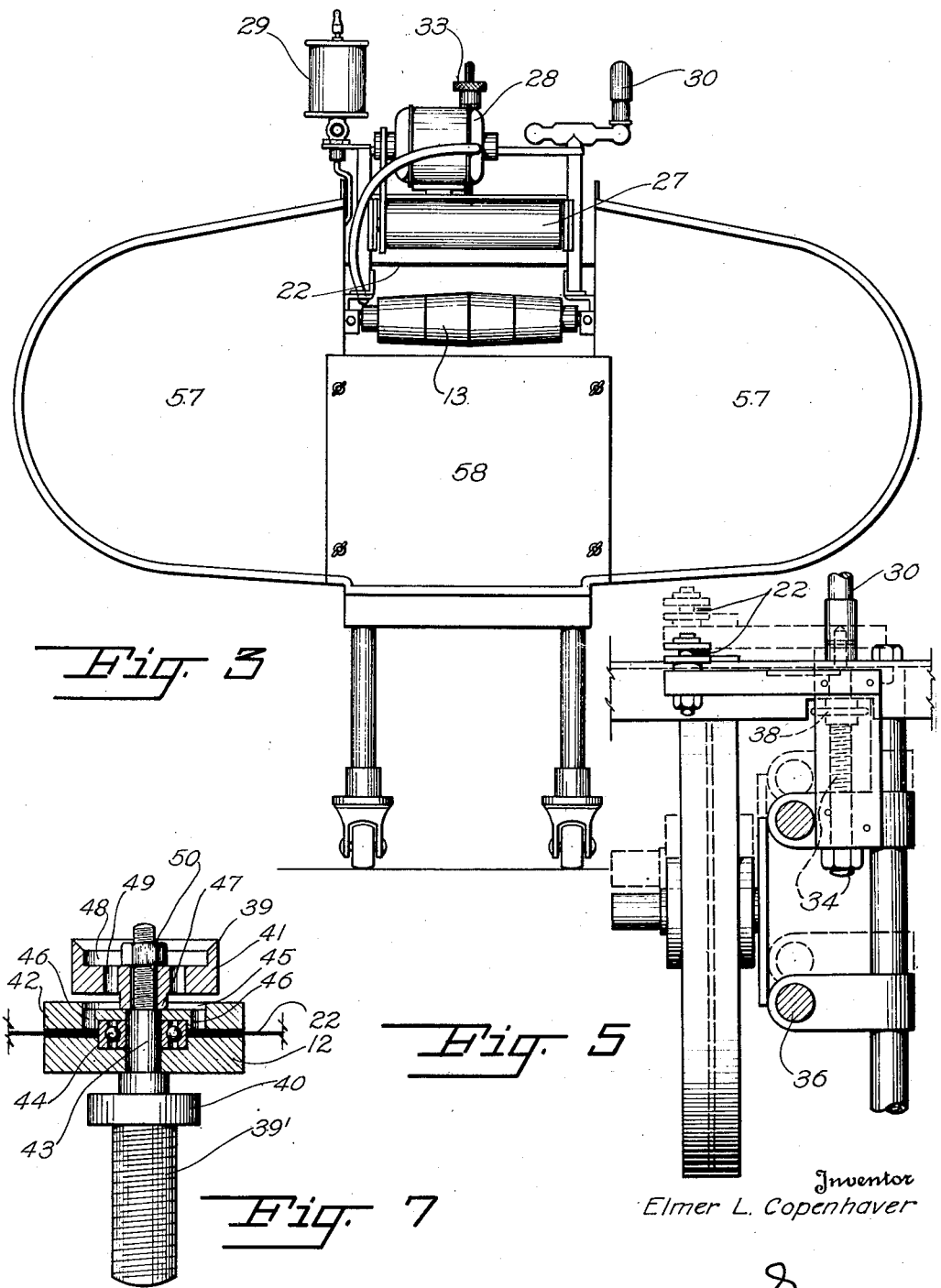
Inventor
Elmer L. Copenhaver
By Bernard F. Gawley
Attorney Feb. 21, 1950     E. L. COPENHAVER     2,498,615
ENDLESS BAND BLADE CAKE SLICING MACHINE Filed Sept. 4, 1945     4 Sheets-Sheet 4

Inventor
Elmer L. Copenhaver

By Bernard F. Garvey
Attorney

Patented Feb. 21, 1950

2,498,615

UNITED STATES PATENT OFFICE 2,498,615

ENDLESS BAND BLADE CAKE SLICING MACHINE

Elmer L. Copenhaver, Charleston, W. Va., assignor to Purity Research & Development Corporation, a corporation of West Virginia Application September 4, 1945, Serial No. 614,409

5 Claims. (Cl. 146—88)

The device of the present invention comprises a cake slicing or cake slabbing machine, which is especially adapted for use in bakeries although it is susceptible of many other uses.

Difficulties have been incurred in use of high speed machines employed in cake cutting especially in blade failure; a clean entering cut in the initial impingement of the blade with the cake periphery, as well as later while the blade is passing through the cake, is essential, not only to effect the desired cut, but also to prevent surface fracture and erosion. After experiment I have found by following the teaching of the present invention that a continuous blade or saw may be used to cut cake in slices of any desired thickness and at a rate of speed heretofore not thought to be possible while accomplishing the desired precision cutting from the moment of contact with the cake until the blade completely clears the latter.

Objects of this invention include a relatively simple portable machine wherein the cake is held in a predetermined fixed position, while being cut, without crushing or breaking the cake and with the utilization of a minimum amount of pressure; to provide novel means for adjusting the cutting mechanism as a unit; to provide means for automatically tensioning of the cutting blade; to provide novel lubricating means for positively covering the surface area of the blade with a lubricant immediately preceding engagement of the blade with the cake; and to provide a blade cleaner through which the blade is trained for relieving the blade of adhering particles after leaving the cake.

It has been found in actual use that the device of the present invention will operate to cut in excess of 1200 dozen cakes a day, working six hours a day and by a change in the speed ratios of the motor and driving mechanism this output may be substantially increased. To do this without cake fracture and to effect precision cut, it is necessary that the blade be kept constantly and thoroughly lubricated. I have found that for this purpose, it is desirable to employ a novel lubricating well through which the blade passes just before entering the cake zone, the well being constantly supplied with mineral oil or like lubricant, supplied from a receptacle forming a part of the slicing machine. It is also important in preventing cake fracture that the cake be firmly held without crushing and this is accomplished in the present invention through the medium of a friction belt which cooperates with the cake carrying belt, the friction belt being slidable during contact of the cake therewith.

Other objects of the invention will be apparent from the following description of the present preferred form of the invention wherein;

Figure 2 is a front elevational view of the machine illustrating its application with a cake mounted on the cake-carrying belt, portions of the machine being removed to disclose details;

Figure 3 is a front elevational view of the machine entity.

Figure 5 is a detail fragmentary elevational view showing to advantage the cutter adjusting means looking from one side of the machine.

Figure 7 is a detail sectional view of the lubricating means employed in the present invention.

Figure 1:
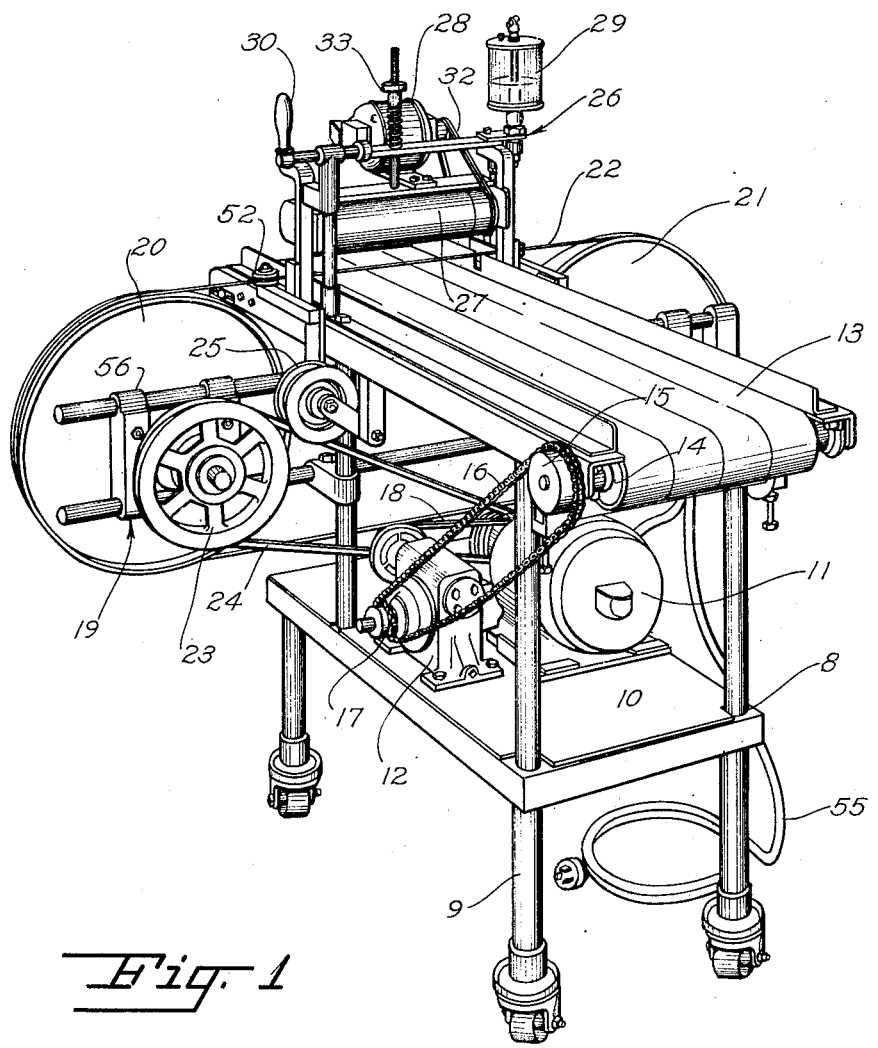
Figure 1 is a perspective view of a cake slicing machine constructed in accordance with the present invention.

The present invention includes a portable frame or support 8 which may be of any desired shape or size and is equipped with caster bearing legs 9. The frame includes a shelf 10 upon which is mounted a motor 11 and a speed reducer 12. Also included in the frame 8 is an endless cake carrying belt 13 which is trained over rollers 14 mounted in the opposite ends of the frame as shown to advantage in Figures 1 and 6. The roller at one end of the frame projects beyond one side of the latter and carries a sprocket wheel 15 which is engaged by a sprocket chain 16. The chain 16 is likewise engaged with a sprocket 17 which is carried by and in operative connection with the speed reducer 12. The speed reducer and motor 11 are in operative connection by means of a belt 18. Consequently, when the motor 11 is operated, motion is imparted to the endless cake carrying belt 13 through the speed reducer 12 and the sprocket chain 16 in an obvious manner.

A cake slicing or slabbing unit generally designated 19 is mounted on the frame 8. The unit includes wheels 20 and 21 around which an endless blade or saw 22 extends. The blade is operated by rotation of the wheels 20 and 21. Motion is imparted to the wheel 20 through a pulley 23 which is operatively engaged to the motor 11 by a drive belt 24. The belt 24 is engaged by an idler 25 for an obvious purpose. It is now apparent that the motor 11 in addition to providing power to operate the cake carrying belt 13, likewise serves to actuate the cutting blade 22 which, as shown to advantage in the drawings, extends transversely across the belt 13 in super-posed relation to the latter.

The speed reducer 12 effects variation in the velocity of travel of the belt 13 in an obvious manner.

The frame 8 also includes a super-structure generally designated 26 which constitutes a supporting means for a friction belt 27, motor 28 for operating the belt, lubricating receptacle 29 and means including a screw operating handle 30 for adjusting the cutting unit 19. The endless belt 27 is carried by friction rollers 31 adapted to be operated by the motor 28 through a belt 32. The friction rollers and belt are vertically adjustable by means 33 including a spring pressed nut carried by a threaded shaft which constitutes a part of the super-structure 26. The belt 27 is adapted for engagement with the top of the cake in order to hold the latter in a predetermined position during the cutting operation. The belt is so mounted, however, that it slips during passage of the cake therebetween and the belt 13 to prevent breakage or mutilation of the cake. At the same time, positive means is provided for holding the cake in a pre-determined position on the belt 13 until after the cake has cleared the blade 22.

The device of the present invention additionally includes suitable means for raising and lowering the slicing blade 22 to permit slices or slabs of any desired thickness to be cut. The adjusting means used for this purpose includes vertical threaded shafts 34 carried by the frame 8. The shafts extend through bearing collars 35 which form a part of a sub-frame 36, upon the ends of which latter the wheels 20 and 21 are rotatably mounted. The threaded shafts 34 may be simultaneously operated, through manipulation of the handle 30, due to a chain 37 which complements and is engaged with sprockets 38 carried by the shafts 34. It is obvious that vertical adjustment of the sub-frame 36 results in relative movement of the blade 22 with respect to the belt 13, permitting continuous adjustment of the blade to permit cutting slices of any thickness.

The blade 22 just before its contact with a cake is adapted to be thoroughly lubricated and for this purpose I have devised a lubricating means or blade oiler 39 of special design as illustrated in Figure 7. This means comprises a screw shaft 39', the base of which is relatively large. At the top of the screw a boss 40 is formed which carries super-imposed upper and lower wells 41 and 42 respectively. As is apparent from Figure 7, the top of the shaft 39' is gradually reduced and an intermediate part 43 thereof is smooth. A bearing 44 is mounted for free movement on the shaft portion 43 of the screw. The bearing 44 is constantly engaged by the blade 22 during travel of the latter through an opening formed in the lower well 42. The upper surface of the lower well 42 is dished out to provide a sump 45 into which the lubricant gravitates from the upper well 41. The lubricant passes from the sump 45 into openings 46 which are located immediately above the blade 22. The hub of the well 41 is extended inwardly to provide a collar 47, which engages the top of the shaft portion 43 of the shaft 39' and also the base of the sump 45. The top of the well 41 is also dished out to provide a reservoir 48 which communicates with openings 49, through which latter the lubricant gravitates into the sump 45.

The lubricant assembly, including the two wells 41 and 42 and bearing 44, are held from displacement on the top of the shaft 39' by a nut 50. This nut is engaged with complemental threads on the upper reduced end of the screw shaft and is adapted to bear against the base of the reservoir 48, as shown in Figure 7. The screw shaft is in detachable engagement with the sub-frame 36 and positioned as shown to advantage in Figure 4. It is held from displacement in the frame by suitable means 51.

Figures 4, 6:
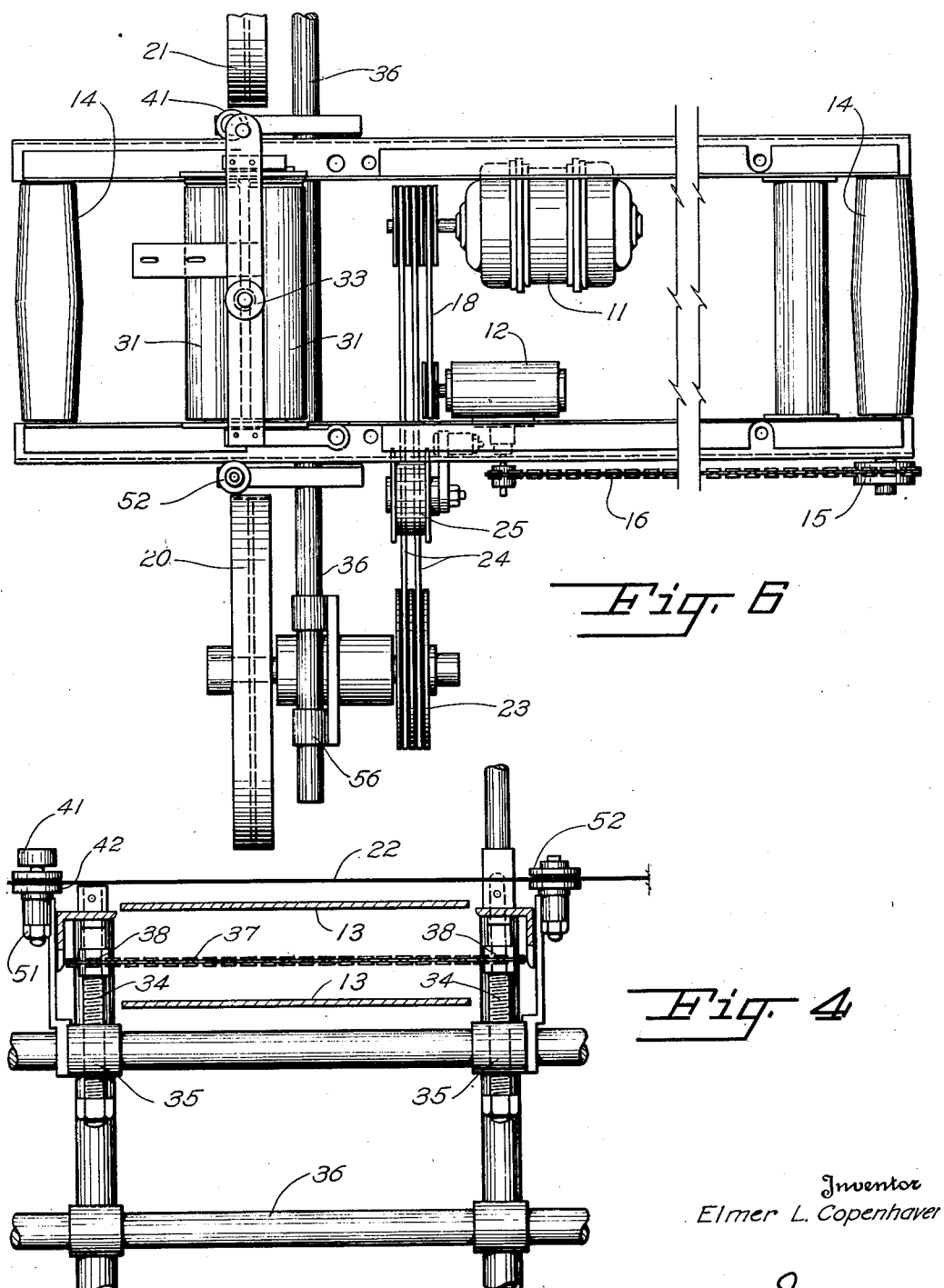
Figure 4 is a detail fragmentary transverse sectional view through the cutter showing to advantage the cutting blade adjusting means looking from one end of the machine.
Figure 6 is a plan view of the machine with parts removed to disclose details.

As shown to advantage in Figure 4, the blade oiler extends upwardly from one side of the frame adjacent one of the lateral margins of the belt 27. Parallelly arranged on the opposite side of the frame and also carried by the sub-frame 36 is a blade cleaner 52 through which the blade 22 passes. The cleaner may be of any desired construction in order to relieve the blade of adhering particles. The cleaner is detachable to permit removal for cleaning or replacement of parts.

The lubricant receptacle 29 is provided with an outlet tube 53, the outlet end of which overhangs the blade oiler 39. Preferably the lubricant employed is a mineral oil which will gravitate into the reservoir 48 of the upper well and pass through openings 49 into the sump 45 of the lower well through openings 46 for impingement with the blade 22. By this arrangement, I have found that the oil will be distributed in a manner to effect consummate lubrication of the surface area of the blade 22 during passage of the latter through the blade oiler. At the same time no surplus oil adheres to the blade. The receptacle 29 is valved in any suitable manner as indicated at 54.

The motor 11 may be engaged in circuit, in a manner well known in the art, with the city current through a cable 55 or the like. Operation of the motor correspondingly sets in operation, at the option of the operator, the cake carrying belt 13 and the blade 22. The friction belt 27 is simultaneously operated by the motor 28 which is likewise circuited with city current in any desired manner.

In addition to the vertical adjustment of the blade 22 tensioning of the latter may be accomplished by suitable tensioning means 56 mounted on the sub-frame 36 and engaged with the axle of the tensioning wheel 21.

Preferably the mechanism employed herein is encased as illustrated in Figure 3. For this purpose, detachable housings 57 are employed which completely cover the wheels 20 and 21 and the other mechanism carried by the frame and are detachably engaged by a plate 58. It is, of course, apparent that the plate 58 and housings 57 may be expeditiously removed when it is desired to gain access to any part of the mechanism for adjustment, repair or replacement.

Although I have herein shown and described a preferred form of this invention, I am nevertheless aware that various changes may be made therein within the scope of the claims hereto appended.

What is claimed is:

1. A cake slicer comprising a frame, an endless cake carrying belt on the frame, a blade arranged to operate in super-posed relation to the belt, a blade oiler on one side of said belt through which the blade travels preparatory to engagement with the cake, the oiler including a rotatably mounted oil well in communication with the blade, and a blade cleaner on the opposite side of the belt through which the blade travels after having passed through the cake.

2. A cake slicer comprising a support, a cake conveyor mounted in the frame, a blade arranged to operate on a cake carried by the conveyor, means overhanging the conveyor and blade to hold the cake from displacement during slicing, a blade oiler on one side of the conveyor through which the blade passes before engaging the cake, the oiler including a rotatably mounted oil well in communication with the blade, and a blade cleaner on the other side of the conveyor through which the blade is drawn after leaving the cake.

3. A cake slicer including a support, a cake conveyor on the support, a blade movable across the conveyor to slice cake carried by the latter, a blade oiler on one side of the conveyor through which the blade passes before engaging the cake, the oiler including a rotatably mounted oil well in communication with the blade, a blade cleaner on the opposite side of the conveyor through which the blade passes after the cuting operation and means engaged with said blade, oiler and cleaner to effect unit adjustment thereof when the thickness of the cake slice is to be increased or diminished.

4. A cake slicer comprising a support; a cake conveyor on the support; a blade movable across the conveyor to slice cake carried by the latter; a superstructure, carried by the support, overhanging the blade and conveyor; a slip belt carried by the superstructure; means carried on the superstructure to operate said belt; a blade oiler engaged with the superstructure, through which the blade passes before contact with the cake; a lubricant receptacle carried by the superstructure above the blade oiler and in communication with the latter; and a blade cleaner through which the blade passes after the cutting operation.

5. A cake slicer comprising a frame, an endless cake carrying belt mounted in the frame, an endless blade on the frame arranged to operate in super-posed relation to the belt, and a blade oiler on the frame at one side of the belt to lubricate the blade preparatory to its engagement with the cake, the blade oiler including rotatably mounted metallic disks between which the blade is arranged to slide, the upper of said disks being provided with an oil receiving well which is in communication with the space between the disks.

ELMER L. COPENHAVER.

REFERENCES CITED

The following references are of record in the file of this patent:

UNITED STATES PATENTS

| Number | Name | Date |
|---|---|---|
| 762,940 | Poignant | June 21, 1904 |
| 1,453,335 | Bennett | May 1, 1923 |
| 1,590,708 | Swanson | June 29, 1926 |
| 1,640,951 | Leibing | Aug. 30, 1927 |
| 1,665,888 | Litty | Apr. 10, 1928 |
| 1,916,596 | Winfree | July 4, 1933 |
| 1,993,899 | Rieske | Mar. 12, 1935 |
| 2,126,226 | Smith et al. | Aug. 9, 1938 |
| 2,173,336 | Lamere et al. | Sept. 19, 1939 |
| 2,380,564 | Wennmann | July 31, 1945 |